(12) United States Patent
Suga et al.

(10) Patent No.: US 11,483,443 B2
(45) Date of Patent: Oct. 25, 2022

(54) LIGHT EMITTING UNIT, ILLUMINATION APPARATUS, READING APPARATUS, AND RECORDING SYSTEM

(71) Applicant: CANON COMPONENTS, INC., Saitama-ken (JP)

(72) Inventors: Shinichiro Suga, Saitama-ken (JP); Suguru Tashiro, Saitama-ken (JP); Takeshi Sugiyama, Saitama-ken (JP); Junichi Kato, Saitama-ken (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 17/410,065

(22) Filed: Aug. 24, 2021

(65) Prior Publication Data

US 2022/0070326 A1    Mar. 3, 2022

(30) Foreign Application Priority Data

Aug. 27, 2020  (JP) .............................. JP2020-143820
Jun. 18, 2021  (JP) .............................. JP2021-101792

(51) Int. Cl.
  *H04N 1/04*    (2006.01)
  *H04N 1/028*   (2006.01)
  *F21V 29/71*   (2015.01)

(52) U.S. Cl.
  CPC ....... *H04N 1/02835* (2013.01); *F21V 29/717* (2015.01)

(58) Field of Classification Search
  CPC .......................... H04N 1/02835; F21V 29/717
  USPC ......................................... 358/475, 484, 509
  See application file for complete search history.

(56) References Cited

U.S. PATENT DOCUMENTS 6,902,309 B2 *  6/2005  Uemura ............... H04N 1/0318
                                                           362/555
9,357,095 B2 *  5/2016  Enomoto ........... H04N 1/02855

FOREIGN PATENT DOCUMENTS

JP    2012160309 A    8/2012

* cited by examiner

*Primary Examiner* — Cheukfan Lee
(74) *Attorney, Agent, or Firm* — Rossi, Kimms & McDowell LLP

(57) ABSTRACT

A light emitting unit is provided. The light emitting unit comprises a substrate, a light emitting element placed on a first surface of the substrate, a front panel covering the first surface, and a back panel placed on a second surface of the substrate, which is opposite to the first surface. An opening for extracting light emitted by the light emitting element is formed in the front panel, and the opening is formed to overlap a part of a light emitting surface of the light emitting element. The back panel has a thermal conductivity higher than that of the front panel, and includes a projecting portion that projects toward the first surface. The projecting portion is in contact with at least one of the first surface, the light emitting element, or the front panel.

20 Claims, 10 Drawing Sheets

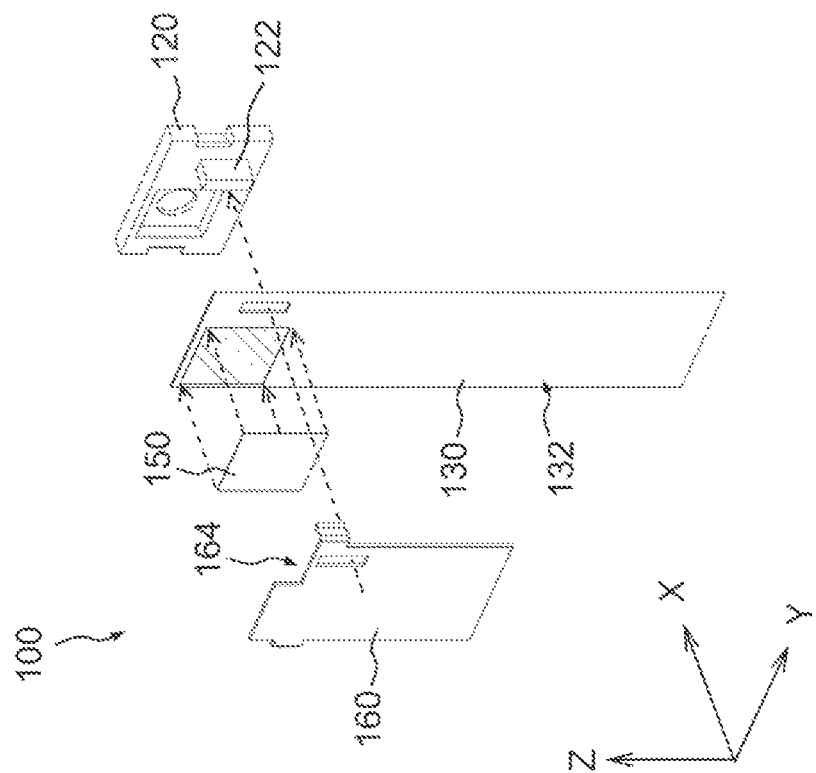
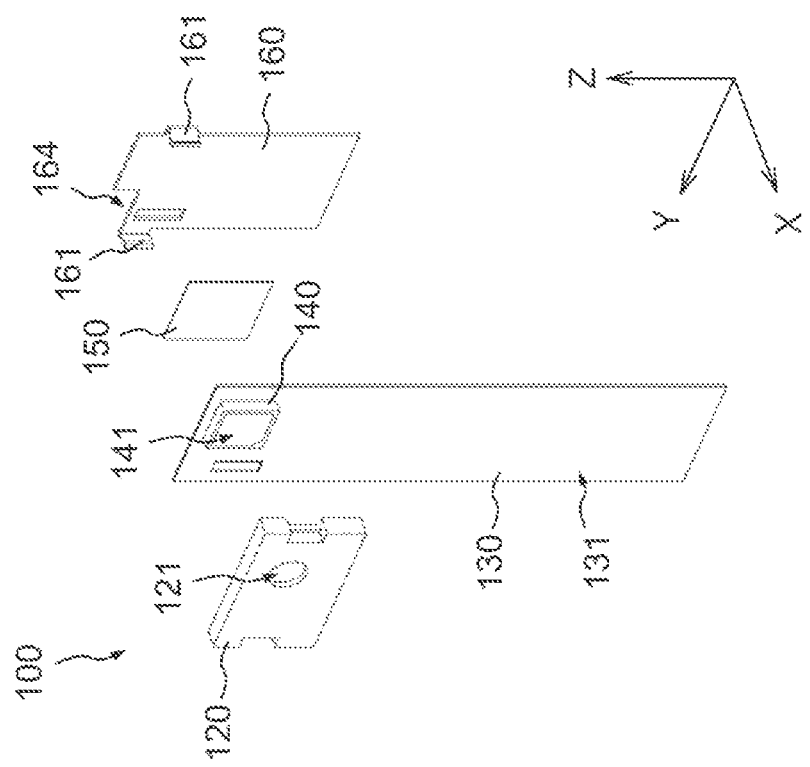
FIG. 2A
FIG. 2B

F I G. 15A

| ELECTRICAL RESISTANCE [Ω] | | NUMERICAL VALUE EXAMPLE 1 | NUMERICAL VALUE EXAMPLE 2 | NUMERICAL VALUE EXAMPLE 3 | NUMERICAL VALUE EXAMPLE 4 |
|---|---|---|---|---|---|
| | FRONT PANEL | $1.0 \times 10^{15}$ | $2.5 \times 10^{5}$ | $4.8 \times 10^{2}$ | $1.0 \times 10^{13}$ |
| | BACK PANEL | $1.72 \times 10^{-8}$ | $5.0 \times 10^{-3}$ | $1.6 \times 10^{-2}$ | $2.0 \times 10^{-6}$ |
| R RATIO = $\dfrac{\text{RESISTANCE VALUE OF FRONT PANEL}}{\text{RESISTANCE VALUE OF BACK PANEL}}$ | | $5.8 \times 10^{22}$ | $5.0 \times 10^{7}$ | $3.0 \times 10^{4}$ | $5.0 \times 10^{18}$ |

F I G. 15B

| THERMAL CONDUCTIVITY [W/m·K] | | NUMERICAL VALUE EXAMPLE 1 | NUMERICAL VALUE EXAMPLE 2 | NUMERICAL VALUE EXAMPLE 3 | NUMERICAL VALUE EXAMPLE 4 |
|---|---|---|---|---|---|
| | FRONT PANEL | 0.4 (0.3~0.5) | 1.0 | 0.2 | 10 |
| | BACK PANEL | 400 (386~402) | 11 | 360 | 50 |
| C RATIO = $\dfrac{\text{THERMAL CONDUCTIVITY OF FRONT PANEL}}{\text{THERMAL CONDUCTIVITY OF BACK PANEL}}$ | | $1.0 \times 10^{-3}$ | $9.1 \times 10^{-2}$ | $5.6 \times 10^{-4}$ | $2.0 \times 10^{-1}$ |

LIGHT EMITTING UNIT, ILLUMINATION APPARATUS, READING APPARATUS, AND RECORDING SYSTEM

BACKGROUND OF THE INVENTION

Field of the Invention

The present invention relates to a light emitting unit, an illumination apparatus, a reading apparatus, and a recording system.

Description of the Related Art

In a light emitting unit to be used in a line sensor and the like, the heat generation amount from a light source increases as the luminance of the light source increases, and influences on the optical characteristics such as the deformation of the end portion of a light guide body and the deterioration of the light source are of concern. Japanese Patent Laid-Open No. 2012-160309 discloses a structure in which a heat radiating member including fins is attached on that surface of a circuit board, which is opposite to a surface on which a light emitting body to be used in a light source unit is placed, in order to control the heat generation of the light emitting body.

SUMMARY OF THE INVENTION

In this structure disclosed in Japanese Patent Laid-Open No. 2012-160309, a reflector is placed between the light emitting body and the light guide body. Since the light guide body is sometimes vulnerable to heat, the light guide body in tight contact with the reflector may deform if the heat generation of the light emitting body raises the temperature of the reflector. Also, a light distribution control member covering a part of the light emitting body is sometimes placed between the light emitting body and the light guide body, in order to control the shape of light emitted from the light emitting body. When the light distribution control member covers a part of the light emitting body, the heat is further accumulated between the light emitting body and the light guide body, and this may cause the deformation of the end portion of the light guide body or the deterioration of the light source.

Some embodiments of the present invention provide techniques advantageous in radiating heat generated from a light source in a light emitting unit.

According to some embodiments, a light emitting unit comprising a substrate, a light emitting element placed on a first surface of the substrate, a front panel covering the first surface, and a back panel placed on a second surface of the substrate, which is opposite to the first surface, wherein an opening for extracting light emitted by the light emitting element is formed in the front panel, the opening is formed to overlap a part of a light emitting surface of the light emitting element, in orthogonal projection with respect to the first surface, the back panel has a thermal conductivity higher than that of the front panel, and includes a projecting portion that projects toward the first surface, and the projecting portion is in contact with at least one of the first surface, the light emitting element, or the front panel, is provided.

According to some other embodiments, a light emitting unit comprising a substrate, a light emitting element placed on a first surface of the substrate, a front panel covering the first surface, and a back panel placed on a second surface of the substrate, which is opposite to the first surface, wherein the back panel has a thermal conductivity higher than that of the front panel, an opening for extracting light emitted by the light emitting element is formed in the front panel, an inner wall of the front panel, which includes a circumferential wall of the opening, has a ventilation portion including at least one of a trench or a through hole extending from the inner wall to an outer edge of the front panel, and an area of the ventilation portion formed in the circumferential wall of the opening is 1% (inclusive) to 20% (inclusive) of an area of the circumferential wall of the opening, is provided.

Further features of the present invention will become apparent from the following description of exemplary embodiments (with reference to the attached drawings).

BRIEF DESCRIPTION OF THE DRAWINGS

FIGS. 2A and 2B are exploded perspective views showing the configuration example of the light emitting unit shown in FIGS. 1A and 1B;

FIGS. 15A and 15B are views showing characteristic examples of front panels and back panels of the light emitting units shown in FIGS. 1A, 1B, 11A, and 11B.

DESCRIPTION OF THE EMBODIMENTS

Figure 1A:
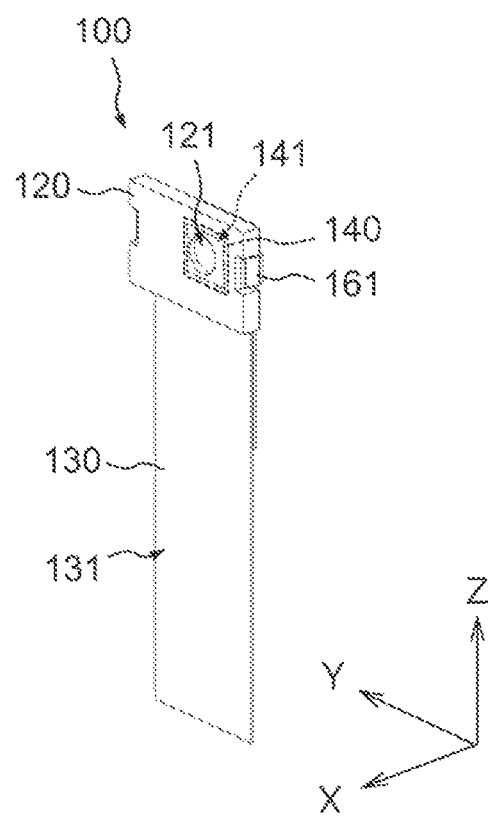
FIGS. 1A and 1B are perspective views showing a configuration example of a light emitting unit according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1B:
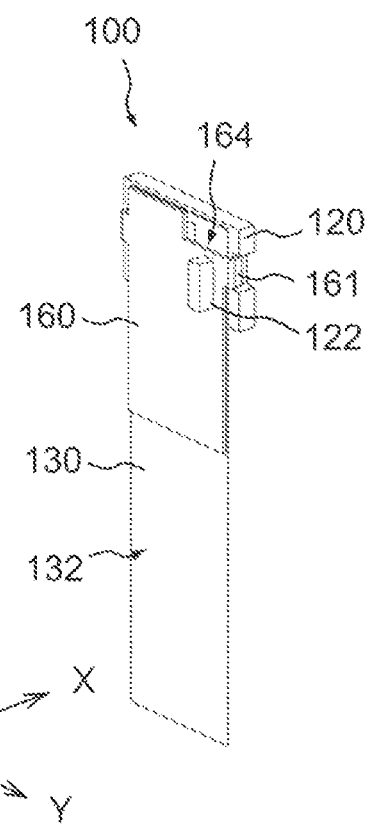

Light emitting units according to embodiments of this disclosure will be explained with reference to FIGS. 1A to 15B. FIGS. 1A and 1B are perspective views showing a configuration example of a light emitting unit 100 of this embodiment. FIGS. 2A and 2B are exploded perspective views showing the configuration example of the light emitting unit 100.

The light emitting unit 100 includes a substrate 130, a light emitting element 140 placed on a surface 131 of the substrate 130, a front panel 120 so placed as to cover the surface 131, and a back panel 160 placed on a surface 132 of the substrate 130, which is opposite to the surface 131. An opening 121 for extracting light emitted by the light emitting element 140 is formed in the front panel 120. In orthogonal projection with respect to the surface 131 of the substrate 130, the opening 121 is so formed as to overlap a part of a light emitting surface 141 of the light emitting element 140. In other words, the front panel 120 covers a part of the light emitting surface 141 of the light emitting element 140. In an illumination apparatus (to be described later) incorporating the light emitting unit 100, the opening 121 can make light emitted from the light emitting element 140 efficiently enter a light guide body, thereby suppressing stray light or the like. The shape of the opening 121 of the front panel 120 can be a circle as shown in FIGS. 1A to 2B, and can also be a rectangle, a polygon, or the like. The light emitting surface 141 can be the whole light emitting surface of the light emitting element 140, and can also be a portion that actually emits light, of the light emitting surface of the light emitting element 140. The front panel 120 can be in contact with both (the surface 131 of) the substrate 130 on which the light emitting element 140 is placed, and the light incident surface of the light guide body (or a light guide body cover member in contact with the light incident surface) of the illumination apparatus (to be described later) incorporating the light emitting unit 100. Since the front panel 120 is in contact with both the substrate 130 and the light incident surface of the light guide body of the illumination apparatus, the light emitting element 140 (the light emitting surface 141 or a light generating surface) placed on the substrate 130 and the light incident surface of the light guide body are not brought into contact with each other. That is, the front panel 120 functions as a spacer for forming an air layer between the light emitting element 140 and the light guide body, so the heat generated by the light emitting element 140 is not easily conducted to the light guide body.

In this embodiment, the opening 121 is so formed as to overlap a part of the light emitting surface 141 of the light emitting element 140. However, the layout of the opening 121 is not limited to this one. For example, the opening 121 may also be placed so as to overlap the whole light emitting surface 141 of the light emitting element 140. In other words, the front panel 120 need not cover the light emitting surface 141 of the light emitting element 140. The shape and size of the opening 121 of the front panel 120 can appropriately be adjusted in accordance with the configuration of the illumination apparatus incorporating the light emitting unit 100.

The front panel 120 can be formed by a resin material having good thermal characteristics. The good thermal characteristics include a high heat resistance, a low thermal expansion coefficient, and the like. Resins such as polycarbonate, polyetheretherketone, and ABS can be used as the front panel 120.

The substrate 130 can be a so-called printed circuit board containing, for example, an epoxy resin or a polyimide resin. The substrate 130 can also be a ceramic substrate. Wiring patterns (conductors, not shown) for supplying electric power to the light emitting element 140 can be formed on the surfaces 131 and 132 of the substrate 130. The wiring patterns can be formed on only the surface 131, and can also be formed on both the surfaces 131 and 132. Furthermore, the substrate 130 can also be a multilayered wiring board. It is only necessary to appropriately form the wiring patterns in accordance with conditions required of the light emitting unit 100.

Figure 3A:
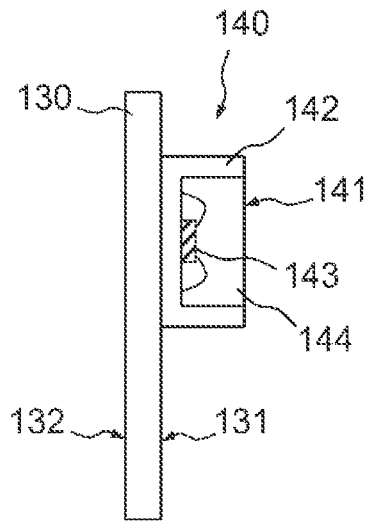
FIGS. 3A to 3C are sectional views showing configuration examples of a light emitting element to be used in the light emitting unit shown in FIGS. 1A and 1B.
Figure 3B:
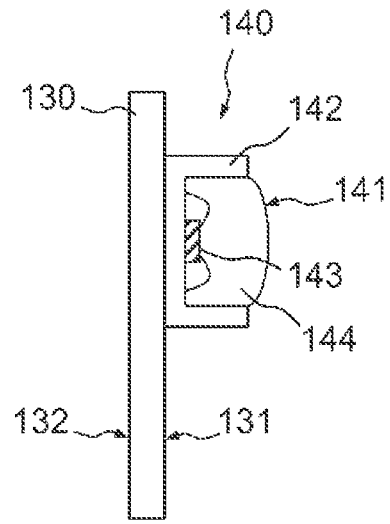
Figure 3C:
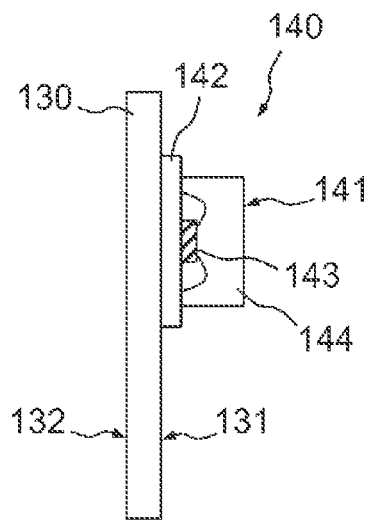

FIGS. 3A to 3C are sectional views showing configuration examples of the light emitting element 140. As shown in FIG. 3A, the light emitting element 140 has a structure in which a light emitting diode (LED) chip 143 placed in a case 142 is sealed by a resin 144. The light emitting element 140 can be so designed as to emit white light. In this case, an LED that emits blue light and an LED that emits yellow light can be used as the LED chip 143. It is also possible to, for example, use an LED that emits blue light as the LED chip 143, and disperse, in the resin 144, a phosphor that emits yellow light when excited by the blue light. The light emitting element 140 can also be a surface mount type element that is mounted on the surface 131 of the substrate 130. The light emitting element 140 can further be a so-called top-surface-emitting type element in which the light emitting surface 141 is formed on a surface opposite to a surface that faces the surface 131 of the substrate 130.

As shown in FIG. 3A, the shape of the light emitting surface 141 can be a flat shape. As shown in FIG. 3B, the shape of the light emitting surface 141 can also have a projecting shape that projects toward the light emitting side from the case 142. Furthermore, as shown in FIG. 3C, the light emitting element 140 can have a structure in which the side surfaces of the resin 144 are not covered with the case 142, so light is emitted to surfaces except the surface on the side of the substrate 130.

The back panel 160 is a member having a thermal conductivity higher than that of the front panel 120. Metal materials such as aluminum and copper and their alloys can be used as the back panel 160. As shown in FIGS. 1A to 2B, the back panel 160 has a projecting portion 161 that projects toward the surface 131 of the substrate 130. The projecting portion 161 is in contact with at least one of the surface 131 of the substrate 130, the light emitting element 140, or the front panel 120. In the structures shown in FIGS. 1A to 2B, the projecting portion 161 is in contact with the front panel 120.

The light emitting unit 100 has the possibility that the heat generation amount of the light emitting element 140 increases and the LED placed in the light emitting element 140 deteriorates. There is also the possibility that an optical part such as the light guide body of the illumination apparatus incorporating the light emitting unit 100 deforms due to heat. Therefore, heat generated by the light emitting element 140 placed on the surface 131 of the substrate 130 must be released toward the surface 132 of the substrate 130. However, the substrate 130 using the material having a low thermal conductivity as described above makes it difficult to release heat, which is generated from the light emitting element 140 placed on the surface 131, toward the surface 132.

In this embodiment, therefore, the projecting portion 161 of the back panel 160 having a thermal conductivity higher than that of the front panel 120 projects in the direction from the surface 132 to the surface 131 of the substrate 130, and comes in contact with the front panel 120. Accordingly, heat generated by the light emitting element 140 placed on the surface 131 of the substrate 130 can efficiently be conducted toward the surface 132 of the substrate 130, and radiated from the back panel 160. Even when the projecting portion 161 is in contact with the surface 131 of the substrate 130 or in direct contact with the light emitting element 140, it is similarly possible to conduct heat from the surface 131 to the surface 132 of the substrate 130, and radiate the heat from the back panel 160. As shown in FIGS. 1A to 2B, the back panel 160 can be larger than the front panel 120. The heat radiating effect can be improved by increasing the area of the back panel 160.

As shown in FIGS. 1A to 2B, the back panel 160 can also extend toward the surface 131 of the substrate 130 from outside the outer edges of the substrate 130. In this case, as shown in FIGS. 1A to 2B, the projecting portion 161 can also function as a fitting portion (engaging portion) to be fitted (engaged) on the front panel 120. This can facilitate assembling the substrate 130 on which the light emitting element 140 is placed, the front panel 120, and the back panel 160, and facilitate positioning during the assembling.

Figure 4A:
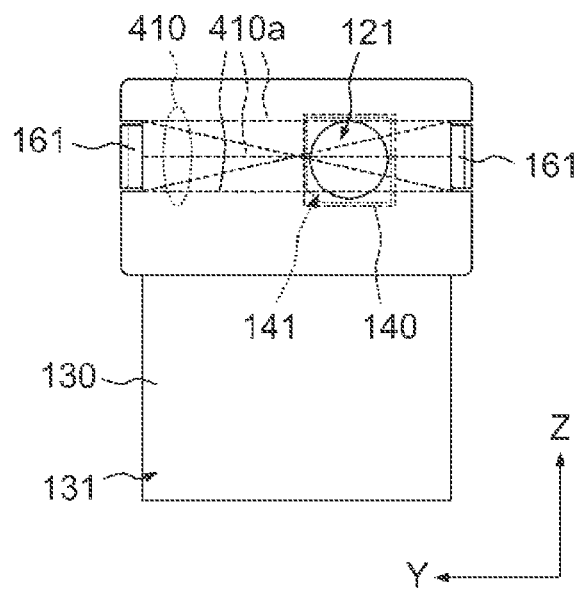
FIGS. 4A and 4B are views showing a configuration example of a projecting portion of the light emitting unit shown in FIGS. 1A and 1B.

For example, as shown in FIGS. 1A to 2B, a case in which two projecting portions 161 that function as fitting portions are formed will be explained below. In this case, as shown in FIG. 4A, in orthogonal projection with respect to the surface 131 of the substrate 130, a virtual line 410 connecting the projecting portions 161 that function as two fitting portions can be formed so as to pass through the light emitting element 140. In this case, the virtual line 410 can include virtual lines 410a parallel to lines that connect two sides facing each other of the outer edges of the substrate 130 at the shortest distance. When the projecting portions 161 that function as two fitting portions are arranged as described above, the projecting portions 161 of the back panel 160 can be arranged close to the light emitting element 140. Since the projecting portions 161 of the back panel 160 having a high thermal conductivity are arranged close to the light emitting element 140 that generates heat, the heat can easily be conducted to the surface 132 of the substrate 130.

A case in which the front panel 120 is brought into close contact with the light emitting element 140 will be explained below. In this case, when the virtual line 410 connecting the two projecting portions 161 that function as fitting portions is so formed as to pass through the light emitting element 140, the force acting toward the light emitting element 140 can be applied to the front panel 120 more evenly. Heat can be conducted from the light emitting element 140 to the front panel 120 by bringing the front panel 120 into contact with the light emitting element 140 more reliably. Consequently, heat generated by the light emitting element 140 can be conducted to the back panel 160 via the front panel 120 more efficiently than when the air is interposed between the front panel 120 and the light emitting element 140.

Figure 4B:
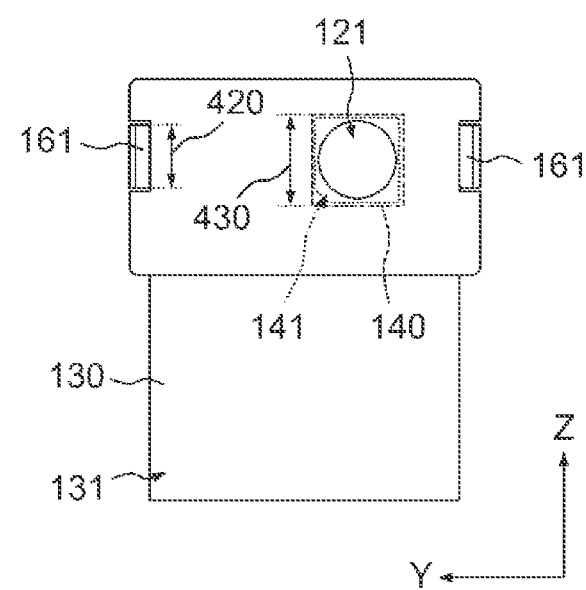

Furthermore, assume, as shown in FIGS. 1A to 2B and FIG. 4B, that the direction in which the projecting portions 161 functioning as two fitting portions of the back panel 160 and the light emitting element 140 are arranged is the Y direction, and a direction perpendicular to the Y direction is the Z direction. The Y and Z directions are parallel to the surfaces 131 and 132 of the substrate 130. Assume also that a direction perpendicular to the Y and Z directions and extending from the surface 132 to the surface 131 of the substrate 130 is the X direction. The X, Y, and Z directions can be perpendicular to each other. In this case, as shown in FIG. 4B, a length 420 in the Z direction of the projecting portion 161 functioning as a fitting portion can be ⅓ or more a length 430 of the light emitting element 140 in the Z direction. When the Z-direction length of the projecting portion 161, which is fitted on the front panel 120, of the back panel 160 is increased, the path that conducts heat from the front panel 120 to the back panel 160 widens. That is, heat can be conducted more efficiently from the surface 131 of the substrate 130 on which the light emitting element 140 is placed to the surface 132. FIGS. 1A to 2B and FIGS. 4A and 4B illustrate the case in which the two projecting portions 161 functioning as fitting portions are formed. However, it is also possible to form three or more projecting portions 161 that function as fitting portions.

Figure 5:
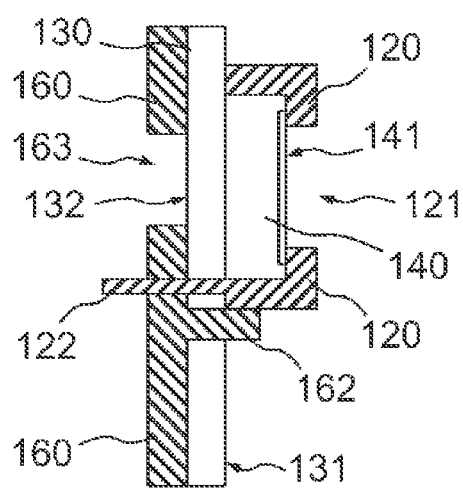
FIG. 5 is a sectional view showing a configuration example of the light emitting unit shown in FIGS. 1A and 1B.

The present invention is not limited to the structure in which the projecting portion 161 of the back panel 160 projects toward the surface 131 of the substrate 130 from outside the outer edge of the substrate 130. FIG. 5 is a sectional view showing the opening 121 of the front panel 120 of the light emitting unit 100. For example, as shown in FIG. 5, the back panel 160 can include a projecting portion 162 that extends through the substrate 130 and projects toward the surface 131 of the substrate 130. In this case, the projecting portion 162 is in contact with at least one of the surface 131 of the substrate 130, the light emitting element 140, or the front panel 120, like the projecting portion 161 described above. Consequently, heat can be conducted from a position close to the light emitting element 140 to the surface 132 of the substrate 130, when compared to a case in which heat is conducted from the outer edge of the substrate 130 to the surface 132 of the substrate 130. The projecting portion 162 can function as a fitting portion as described above. The projecting portion 162 of the back panel 160 can also be used for positioning when assembling the substrate 130 on which the light emitting element 140 is placed, the front panel 120, and the back panel 160. The assembling of the light emitting unit 100 can be facilitated by using the projecting portion 162 for positioning when assembling the substrate 130 on which the light emitting element 140 is placed, the front panel 120, and the back panel 160.

Figure 6:
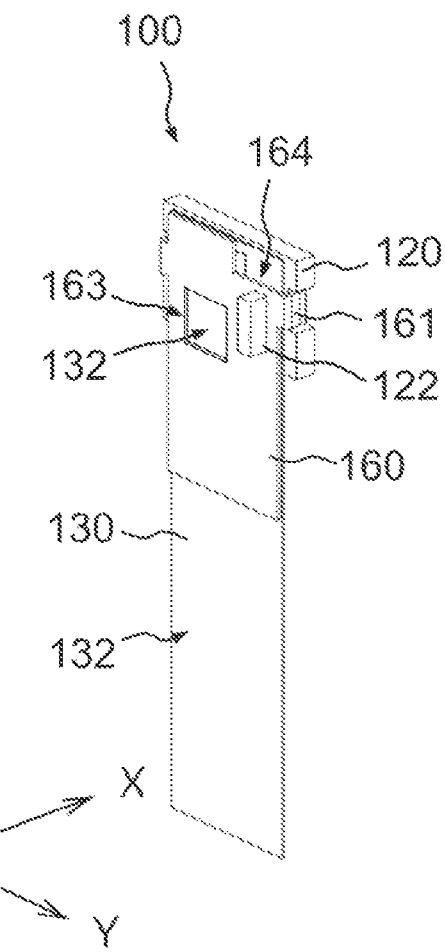
FIG. 6 is a perspective view showing a configuration example of the light emitting unit shown in FIGS. 1A and 1B.

Furthermore, as shown in FIGS. 5 and 6, in orthogonal projection with respect to the surface 132 of the substrate 130, the back panel 160 can include an opening 163 that exposes the surface 132 of the substrate 130, inside the outer edges of the back panel 160. Also, as shown in FIGS. 1B and 6, in orthogonal projection with respect to the surface 132 of the substrate 130, the back panel 160 can include a recessed portion 164 in which the outer edges of the back panel 160 are arranged inside the outer edges of the substrate 130. The surface 132 of the substrate 130 is exposed by forming the opening 163 and the recessed portion 164 in the back panel 160. When the surface 132 of the substrate 130 is exposed, heat can be radiated to the atmosphere directly from the surface 132.

Moreover, as shown in FIGS. 1A to 2B, 5, and 6, the front panel 120 can include a protruding portion 122 that extends through the substrate 130 and protrudes toward the surface 132 of the substrate 130. In this case, the protruding portion 122 can be in contact with the back panel 160. This facilitates conducting heat from the surface 131 to the surface 132 of the substrate 130. As shown in FIGS. 1A to 2B, 5, and 6, the protruding portion 122 can further extend through the back panel 160 and protrude from the back panel 160. This makes it possible to radiate heat directly from the protruding portion 122 to the atmosphere. As shown in FIG. 2B, the protruding portion 122 of the front panel 120 can also be used for positioning when assembling the substrate 130 on which the light emitting element 140 is placed, the front panel 120, and the back panel 160. The assembling of the light emitting unit 100 can be facilitated by using the protruding portion 122 for positioning when assembling the substrate 130 on which the light emitting element 140 is placed, the front panel 120, and the back panel 160.

As shown in FIGS. 2A and 2B, a flexible member 150 having a thermal conductivity higher than that of the front panel 120 can be placed between the back panel 160 and the surface 132 of the substrate 130. The flexible member 150 can also be a double-sided tape containing a resin or the like. For example, the flexible member 150 can be silicone rubber having elasticity and a high thermal conductivity. As shown in FIGS. 2A and 2B, the flexible member 150 can be placed in a position overlapping the light emitting element 140 in orthogonal projection with respect to the surface 131 of the substrate 130. This makes it possible to more efficiently conduct heat from the surface 132 of the substrate 130 to the back panel 160, and radiate the heat from the back panel 160.

Figure 7:
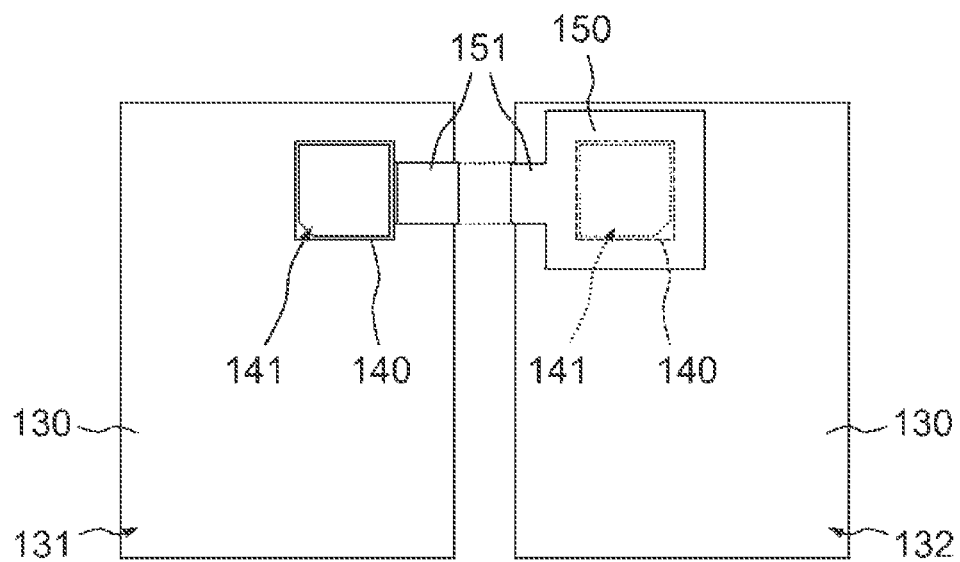
FIG. 7 is a view showing a layout example of a flexible member of the light emitting unit shown in FIGS. 1A and 1B.

As shown in FIG. 7, the flexible member 150 can include an extended portion 151 that extends from the surface 132 to the surface 131 of the substrate 130 through the outer edges of the substrate 130. The extended portion 151 can be in contact with at least one of the surface 131 of the substrate 130, the light emitting element 140, or the front panel 120. As shown in FIG. 7, the extended portion 151 can be in direct contact with the light emitting element 140. Since the flexible member 150 having a thermal conductivity higher than that of the front panel 120 is in contact with the light emitting element 140, heat generated by the light emitting element 140 can be conducted to the surface 132 of the substrate 130 more efficiently.

Figure 8:
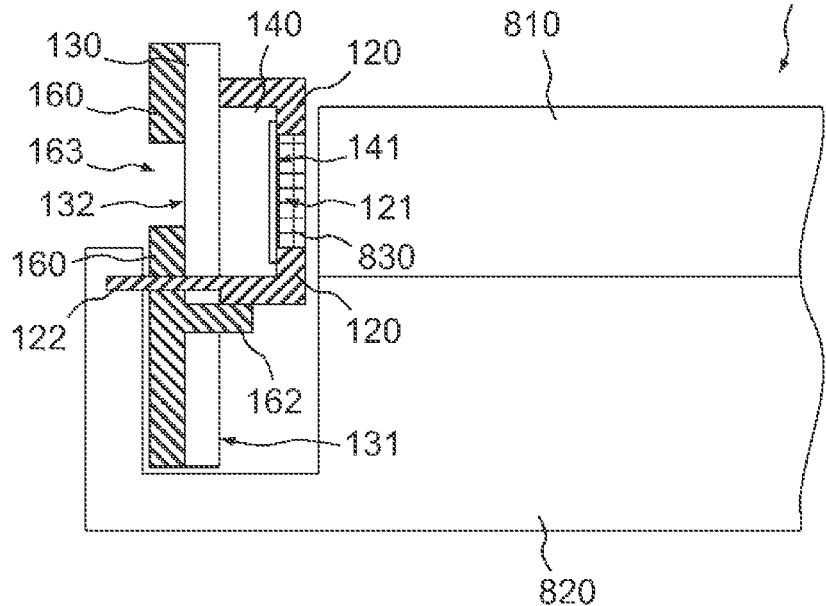
FIG. 8 is a view showing a configuration example of an illumination apparatus incorporating the light emitting unit shown in FIGS. 1A and 1B.

FIG. 8 is a view showing a configuration example of an illumination apparatus 800 incorporating the light emitting unit 100 of this embodiment. FIG. 8 is a sectional view showing the opening 121 of the front panel 120 of the light emitting unit 100 in the illumination apparatus 800. The illumination apparatus 800 includes the light emitting unit 100, a light guide body 810 that guides light emitted from the light emitting unit 100, and a frame 820 accommodating the light emitting unit 100 and the light guide body 820.

As shown in FIG. 8, the light guide body 810 is close to the light emitting unit 100. Also, the light guide body 810 can be placed in contact with the front panel 120 of the light emitting unit 100. A resin such as acryl can be used as the light guide body 810. Since acryl can soften and deform at a temperature of 100° C. or less, it is necessary to make it difficult to conduct heat generated by the light emitting element 140. As described previously, therefore, the light emitting unit 100 of this embodiment is so configured that heat is efficiently conducted from the surface 131, on which the light emitting element 140 is placed, of the substrate 130 to the surface 132 of the substrate 130. In the illumination apparatus 800, therefore, inconveniences caused by heat generated by the light emitting unit 100 can be suppressed.

As shown in FIG. 8, the protruding portion 122 of the front panel 120 described above can be fitted in the frame 820. When the protruding portion 122 is fitted in the frame 820, it is possible to facilitate positioning when assembling the light emitting unit 100 to the frame 820. A metal such as aluminum or its alloy can be used as the frame 820. When the protruding portion 122 of the front panel 120 is fitted in the frame 820 having a thermal conductivity higher than that of the front panel 120, heat generated by the light emitting element 140 can easily be radiated from the protruding portion 122 of the front panel 120 via the frame 820.

As described above, the light guide body 810 is placed close to the light emitting unit 100. Accordingly, heat may be accumulated between the light emitting element 140 and the light guide body 810. In addition, as described previously, when the front panel 120 covers a part of the light emitting surface 141 of the light emitting element 140, the space between the light emitting element 140 and the light guide body 810 narrows, so heat may be accumulated more.

Figure 9A:
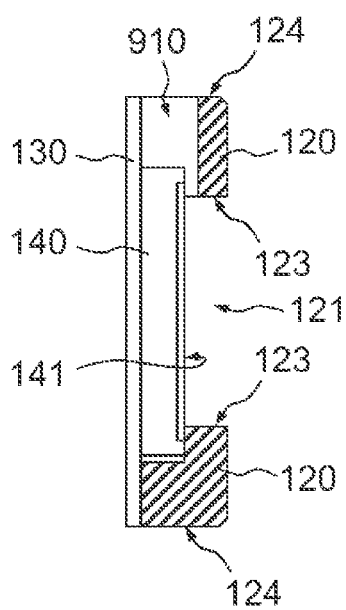
FIGS. 9A to 9D are views showing modifications of a front panel of the light emitting unit shown in FIGS. 1A and 1B.
Figure 9B:
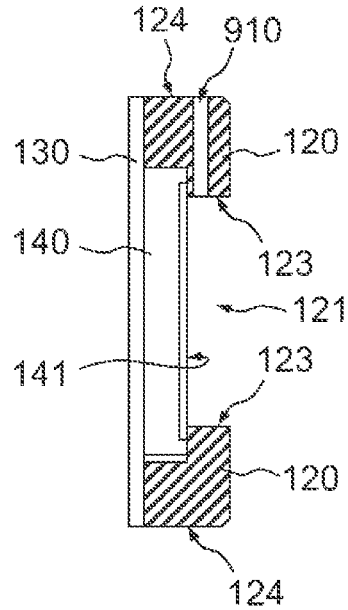
Figure 9D:
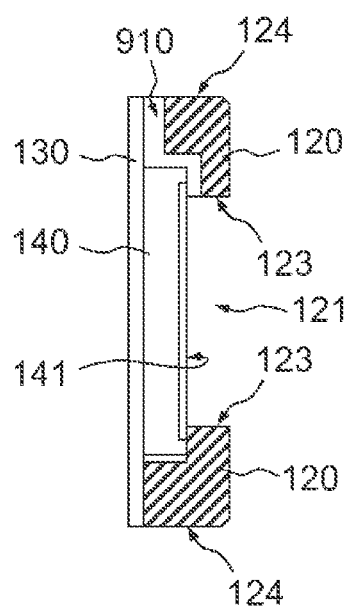

As shown in FIG. 9A, therefore, in the inner wall of the front panel 120, which includes the opening 121 and a circumferential wall 123, a ventilation portion 910 formed by a trench extending from the inner wall to an outer edge (outer wall) 124 can be formed. This trench can be formed in that surface of the front panel 120, which faces the light guide body 810, and can also be formed in the surface facing the light emitting element 140 and the surface 131 of the substrate 130 as shown in FIG. 9A. For example, when it is desirable to conduct no heat to the light guide body 810 (when the material forming the light guide body 810 is a low-heat-resistance material), the trench can be formed in that surface of the front panel 120, which faces the light emitting element 140. When forming two ventilation portions 910, one can be a trench formed in that surface of the front panel 120, which faces the light guide body 810, and the other can be a trench formed in that surface of the front panel 120, which faces the light emitting element 140. From the viewpoint of brightness, as shown in FIG. 9A, the trench forming the ventilation portion 910 can be formed in that portion of the front panel 120, which faces the surface 131 of the substrate 130. Also, as shown in FIG. 9B, in the inner wall of the front panel 120, which includes the circumferential wall 123 of the opening 121, a ventilation portion 910 formed by a through hole extending from the inner wall to the outer edge 124 can be formed. This makes it possible to efficiently release heat between the light emitting element 140 and the light guide body 810 to the outside, and suppress the influence the heat generated by the light emitting element 140 has on the light guide body 810. The ventilation portion 910 can be formed in two or more positions or four or more positions by taking account of the flow of air (a convection).

When forming two ventilation portions 910, one can be formed in the upper surface of the inner wall of the front panel 120, and the other can be formed in the lower surface, in order to allow an easy convection, but the present invention is not limited to this. For example, when two ventilation portions 910 are formed in the upper surface of the inner wall of the front panel 120, high-temperature air (gas) is exhausted from the two ventilation portions 910, whereas air enters the space through the gap between the front panel 120 and the substrate 130, or the gap between the front panel 120 and the light guide body 810. As another example, when one ventilation portion 910 is formed in the upper surface of the inner wall of the front panel 120 and another ventilation portion 910 is formed in a surface that is neither the upper surface nor the lower surface, air is taken into the space from the latter ventilation portion 910, and exhausted from the upper ventilation portion 910. Furthermore, assuming that in orthogonal projection with respect to the surface 131 of the substrate 130, two ventilation portions 910 are used, and the azimuth of the center of the hole (trench) of one of two ventilation portions 910 on the inner wall side is 0° with respect to the center of the light emitting element 140, the center of the hole of the other ventilation portion 910 on the inner wall side of the front panel 120 can fall within the range of 150° to 210°. Note that the "center" can be the geometric barycenter or the center of a circumscribed circle, in a planar view of the hole on the inner wall side of the front panel 120. Furthermore, assuming that the azimuth of the center of one of four ventilation portions 910 is 0°, the azimuths of the centers of second, third, and fourth ventilation portions 910 can be positioned within the ranges of 60° to 120°, 150° to 210°, and 240° to 300°, respectively. This configuration facilitates generating an air flow by an appropriate convection, regardless of the direction in which the light emitting unit 100 of this embodiment is installed. When forming four ventilation portions 910, however, one of the four ventilation portions 910 can fall outside the abovementioned conditions if three of the four ventilation portions 910 satisfy the conditions.

The "inner wall" of the front panel 120 includes the circumferential wall 123 of the opening 121 of the front panel 120, and forms a space (a space containing the light emitting element 140) together with the substrate 130 and the light guide body 810. That is, this inner wall can be formed by only the circumferential wall 123 of the opening 121 of the front panel 120, and can also include members other than the front panel 120, for example, members outside the substrate 130 and the front panel 120, and a light guide body holder (for example, the frame 820) for holding the light guide body 810. Although this space can be sealed, it is also possible, as described previously, to form a gap between the front panel 120 and the light guide body 810, or between the front panel 120 and the substrate 130. This gap can be 20% or less (and can also be 7% or less or 3% or less) of the distance between the substrate 130 (the light emitting surface 141 of the light emitting element 140) and the light guide body 810. Alternatively, this gap can be 30% or less of the diagonal length of the light emitting surface 141 of the light emitting element 140 (and can also be 3% or less or 1% or less of the diagonal length).

The circumferential wall 123 of the opening 121 of the front panel 120 can have a high light reflectance, for example, can be white, in order to make light emitted by the light emitting element 140 enter the light guide body 810 more efficiently. For example, the front panel 120 including the circumferential wall 123 of the opening 121 can be formed by a white resin. As another example, at least the circumferential wall 123 of the opening 121 of the front panel 120 can be painted white, or a metal such as aluminum can be formed on the circumferential wall 123 of the opening 121. For example, the circumferential wall 123 of the opening 121 can have a light reflectance higher than that of the surface 131 of the substrate 130. The light reflectance of the surface 131 of the substrate 130 can be the light reflectance of an insulating resist not including the above-described wiring patterns.

When the circumferential wall 123 of the opening 121 of the front panel 120 easily reflects light, for example, is white, the above-described ventilation portion 910 can be a portion that hardly reflects light. Therefore, if the ratio occupied by the ventilation portion 910 in the inner wall of the front panel 120 increases, light emitted by the light emitting element 140 may not efficiently enter the light guide body 810. In addition, if light emitted from the light emitting element 140 passes through the ventilation portion 910, this light may become stray light. Accordingly, the area of the ventilation portion 910 formed in the opening 121 of the front panel 120 can be 20% or less of the area of the circumferential wall 123 of the opening 121. The area of the ventilation portion 910 formed in the opening 121 of the front panel 120 can further be 10% or less the area of the circumferential wall 123 of the opening 121, in order to reflect light by the circumferential wall 123 of the opening 121 more efficiently, and suppress stray light and the like. When a hole is formed in the front panel 120, the area of the ventilation portion 910 is the area of the hole on the side of the circumferential wall 123 of the opening 121. When a trench is formed in the front panel 120 and portions where the trench is not formed are linearly interpolated in the position of the circumferential wall 123 of the opening 121, the area of the ventilation portion 910 is the area surrounded by the straight lines used in the interpolation and the trench on the side of the circumferential wall 123 of the opening 121.

On the other hand, the ventilation portion 910 must release air between the light emitting element 140 and the light guide body 810 to the outside, and take in the outside air, as described previously. When the present inventors conducted experiments, it was found that the effect of forming the ventilation portion 910 can be obtained when the area of the ventilation portion 910 formed in the circumferential wall 123 of the opening 121 of the front panel 120 is 1% or more of the area of the circumferential wall 123 of the opening 121. It was also found that a higher effect can be obtained when the area of the ventilation portion 910 formed in the circumferential wall 123 of the opening 121 of the front panel 120 is 2% or more of the area of the circumferential wall 123 of the opening 121. From the foregoing, the area of the ventilation portion 910 formed in the circumferential wall 123 of the opening 121 of the front panel 120 can be 1% (inclusive) to 20% (inclusive) and can also be 2% (inclusive) to 10% (inclusive) of the area of the circumferential wall 123 of the opening 121.

Figure 9C:
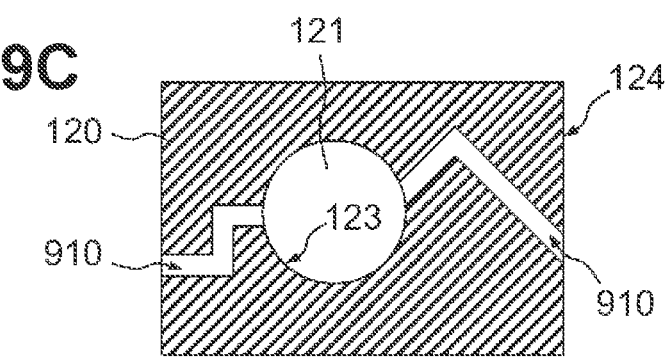

As described above, if light emitted from the light emitting element 140 enters the ventilation portion 910, this light may become stray light. Therefore, although the trench is straight (not bent) in the example shown in FIG. 9A, the ventilation portion 910 can also be bent in orthogonal projection with respect to the surface 131 of the substrate 130 as shown in FIG. 9C. Bending the ventilation portion 910 decreases the possibility that light having entered the ventilation portion 910 passes through the ventilation portion 910. Furthermore, when a trench is formed as the ventilation portion 910 in a portion facing the surface 131 of the substrate 130 of the front panel 120 as shown in a sectional view of FIG. 9D, the ventilation portion 910 can be bent in accordance with the step of the light emitting element 140. FIG. 9C shows a structure in which the ventilation portion 910 is bent at a right angle once or twice, as the bent structure of the ventilation portion 910. However, the bent structure is not limited to these shapes, and can have various shapes. When bending the ventilation portion 910, the trenches shown in FIGS. 9A and 9D may decrease the number of formation steps and improve the easiness of formation when forming the front panel 120, compared to the through hole shown in FIG. 9B.

In addition, the inner wall of the ventilation portion 910 can have a low-light-reflectance color such as black, regardless of whether the ventilation portion 910 is bent. This can suppress stray light from being generated through the ventilation portion 910 formed in the front panel 120.

Also, the circumferential wall 123 of the opening 121 of the front panel 120 need not have a high-reflectance color such as white. For example, a low-reflectance color such as black can be used as the circumferential wall 123 of the opening 121 of the front panel 120. For example, the light reflectance of the circumferential wall 123 of the opening 121 can be lower than that of the surface 131 of the substrate 130. In this case, the light reflectance of the surface 131 of the substrate 130 can be the light reflectance of the insulating resist not including the above-described wiring patterns. When the ventilation portion 910 is formed on the circumferential wall 123 of the opening 121 of the front panel 120, the low reflectance of the circumferential wall 123 of the opening 121 of the front panel 120 can facilitate designing the front panel 120 with respect to the above-described stray light and the like. In addition, even when the ventilation portion 910 is not formed, a low-reflectance color can be used as the circumferential wall 123 of the opening 121 of the front panel 120.

As shown in FIG. 8, a light transmitting member 830 can also be formed in the opening 121 of the front panel 120. The light transmitting member 830 can have the function of, for example, an optical filter. That is, like the relationship between the LED chip 143 and the resin 144 described above, the light transmitting member 830 can function so that an appropriate light component of light emitted by the LED chip 143 or the light emitting element 140 (a combination of the LED chip 143 and the resin 144) enters the light guide body 810. For example, an appropriate phosphor can be dispersed in the light transmitting member 830. In addition, the light transmitting member 830 can have the function of a lens. Also, the light transmitting member 830 can have a function of suppressing the transmission of heat, like heat cutting glass. Two or more of these functions of the light transmitting member 830 can be combined.

Figure 10:
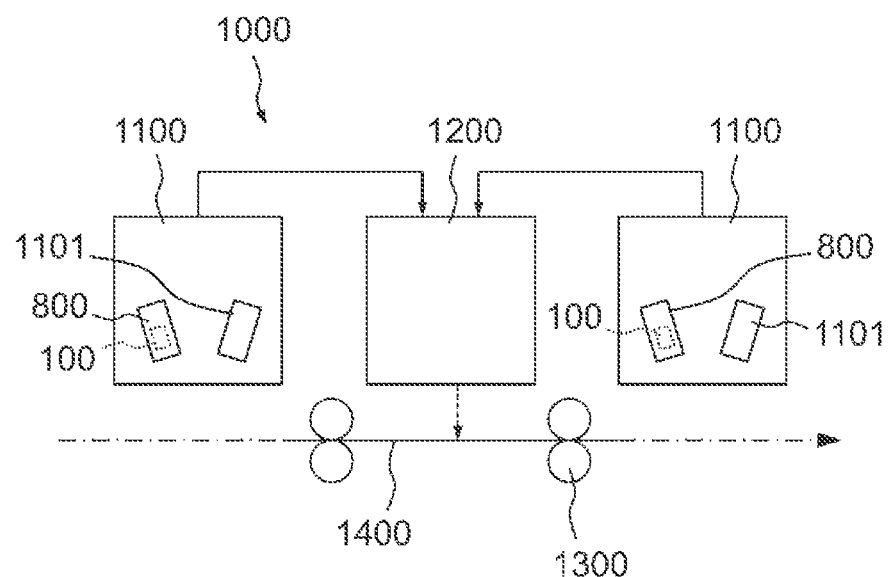
FIG. 10 is a view showing a configuration example of a recording system including the light emitting unit shown in FIGS. 1A and 1B.

The illumination apparatus 800 incorporating the light emitting unit 100 of this embodiment shown in FIG. 8 can further be incorporated in a reading apparatus. FIG. 10 shows a schematic view of a recording system 1000 including a reading apparatus 1100 incorporating the illumination apparatus 800 described above. The recording system 1000 includes a copying machine, a printer, a data recording apparatus for recording data on a hard disk or a memory, or the like. FIG. 10 shows an example in which the recording system 1000 is a copying machine or a printer that records data on a paper medium or the like.

The recording system 1000 shown in FIG. 10 includes the reading apparatus 1100 that incorporates the illumination apparatus 800 and reads a medium, a recording apparatus 1200 that performs recording on a recording medium based on image information obtained by the reading apparatus 1100, and a conveying apparatus 1300 for conveying the recording medium. The reading apparatus 1100 includes the illumination apparatus 800 incorporating the light emitting unit 100, and an image sensor 1101 for obtaining image information of an illumination target illuminated by the illumination apparatus 800.

The recording apparatus 1200 can record an image including characters on a recording medium 1400 (for example, paper) by an arbitrary method such as an inkjet method or an electrophotographic method. As the conveying apparatus 1300, conveyor rollers for conveying the recording medium from the upstream side to the downstream side can be used. In one embodiment, the recording system 1000 can perform a copying process, and in this case the recording apparatus 1200 records image information read by the reading apparatus 1100 as an image on the recording medium. In another embodiment, the recording system 1000 can perform feedback control. For example, the reading apparatus 1100 can read image information on the recording medium having undergone recording by the recording apparatus 1200, and transmit the image information as read data to the recording apparatus 1200. Based on this read data, the recording apparatus 1200 can confirm the recorded state of the recording medium, and control recording parameters for the next recording.

As described above, the recording system 1000 to which the reading apparatus 1100 including the illumination apparatus 800 incorporating the light emitting unit 100 of this embodiment is applied is not limited to an apparatus for performing recording on the recording medium 1400 such as paper. The recording apparatus 1200 can also record, for example, image information read by the reading apparatus 1100 as electronic data on a recording medium such as a hard disk or a memory. In this case, the recording apparatus 1200 can include the recording medium such as a hard disk or a memory. Also, in this case, the recording system 1000 need not include the conveying apparatus 1300 described above.

Figure 11A:
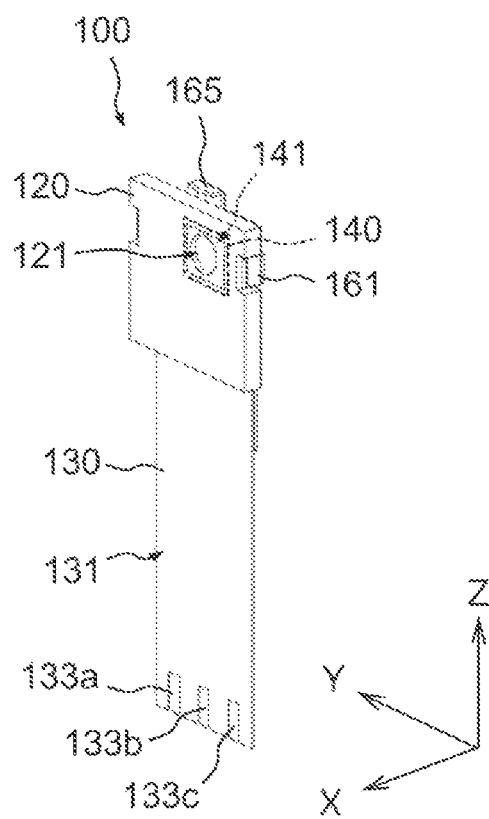
FIGS. 11A and 11B are perspective views showing a modification of the light emitting unit shown in FIGS. 1A and 1B.
Figure 11B:
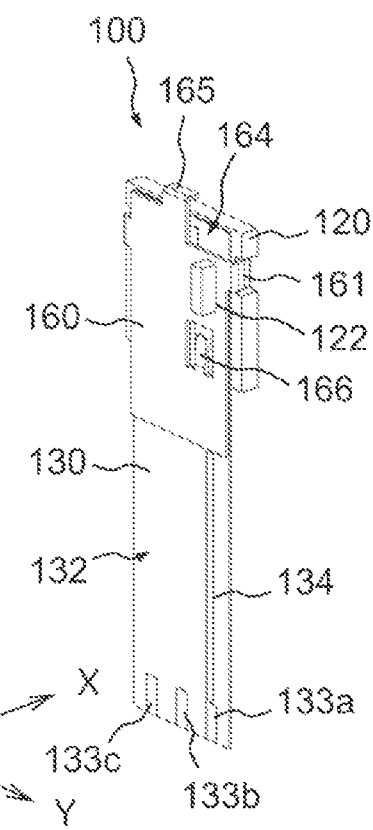
Figure 12B:
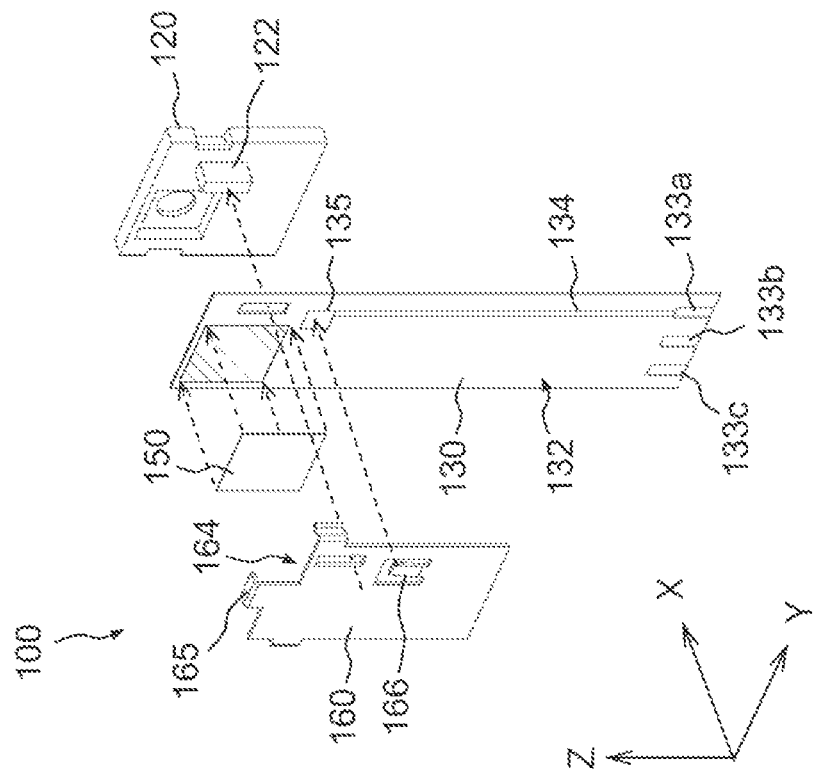
FIGS. 12A and 12B are exploded perspective views showing a configuration example of the light emitting unit shown in FIGS. 11A and 11B.
Figure 12A:
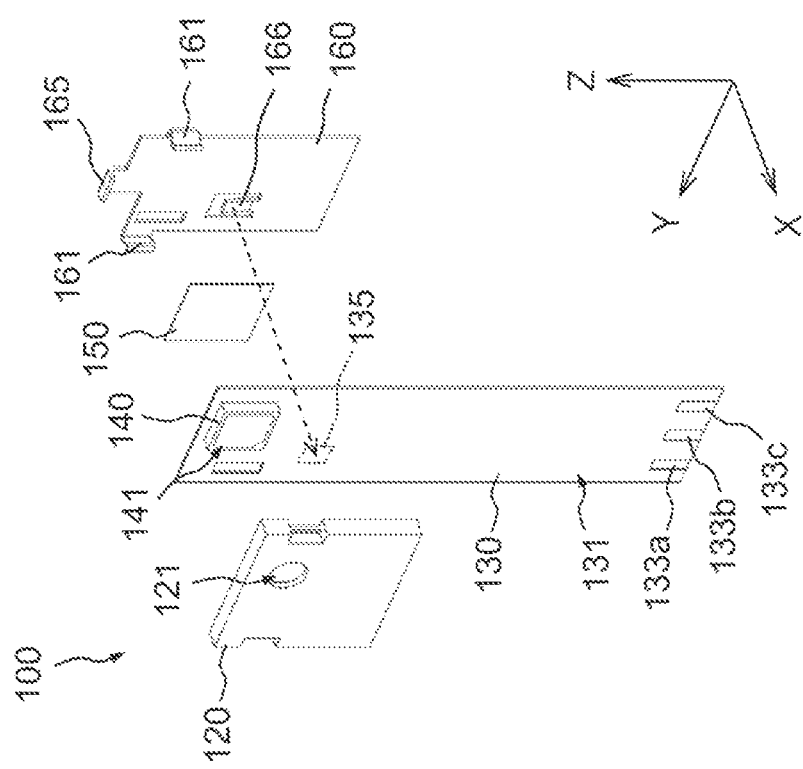

A modification of the back panel 160 will be explained below. FIGS. 11A and 11B are perspective views that correspond to FIGS. 1A and 1B described earlier, and show a configuration example of the light emitting unit 100 including the back panel 160 of the modification. Likewise, FIGS. 12A and 12B are exploded perspective views that correspond to FIGS. 2A and 2B described earlier, and show the configuration example of the light emitting unit 100 including the back panel 160 of the modification.

Figure 13C:
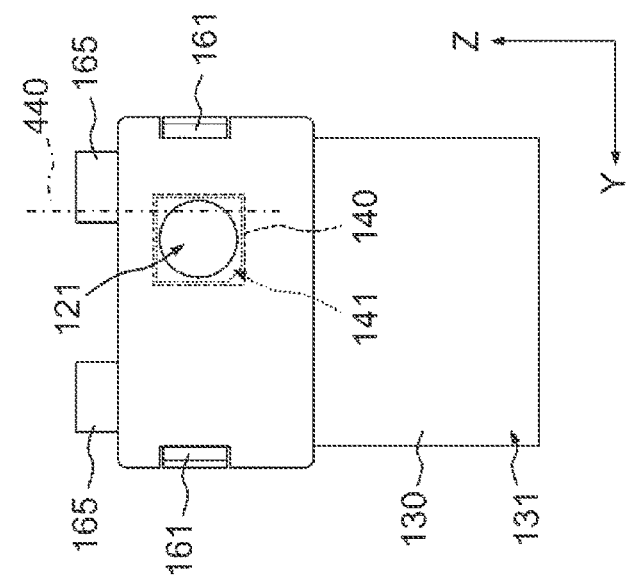
FIGS. 13A to 13C are views showing configuration examples of an extending portion of the light emitting unit shown in FIGS. 11A and 11B.

As shown in FIGS. 11A to 12B, in orthogonal projection with respect to the surface 131 of the substrate 130, the back panel 160 can further include an extending portion 165 that extends outward from the outer edge of the substrate 130. The extending portion 165 can also extend outward from the outer edge of the front panel 120, in orthogonal projection with respect to the surface 131 of the substrate 130. When the back panel 160 has the extending portion 165, not only the area of the back panel 160 increases, but also heat can be radiated from a part of that surface of the back panel 160, which faces the surface 132 of the substrate 130. That is, the effect of radiating heat from the back panel 160 to the atmosphere can further be improved. The extending portion 165 can have a planar shape, and can also include, as shown in FIG. 13A, a portion 165a extending along the surface 132 of the substrate 130, and a portion 165b extending toward the surface 131 of the substrate 130 and connected to the portion 165a. For example, the portion 165b of the extending portion 165 can be so formed as to cover the outer wall of the front panel 120, as shown in FIG. 13A.

As shown in FIGS. 11A to 12B, the extending portion 165 need not be in contact with the surface 131 of the substrate 130, the light emitting element 140, and the front panel 120. This is so because, as described above, the back panel 160 includes the projecting portion 161 and the like and hence can efficiently conduct heat generated by the light emitting element 140 placed on the surface 131 of the substrate 130 toward the surface 132 of the substrate 130, thereby radiating the heat from the back panel 160. The extending portion 165 can also be in contact with at least one of the surface 131 of the substrate 130, the light emitting element 140, or the front panel 120.

Figure 14A:
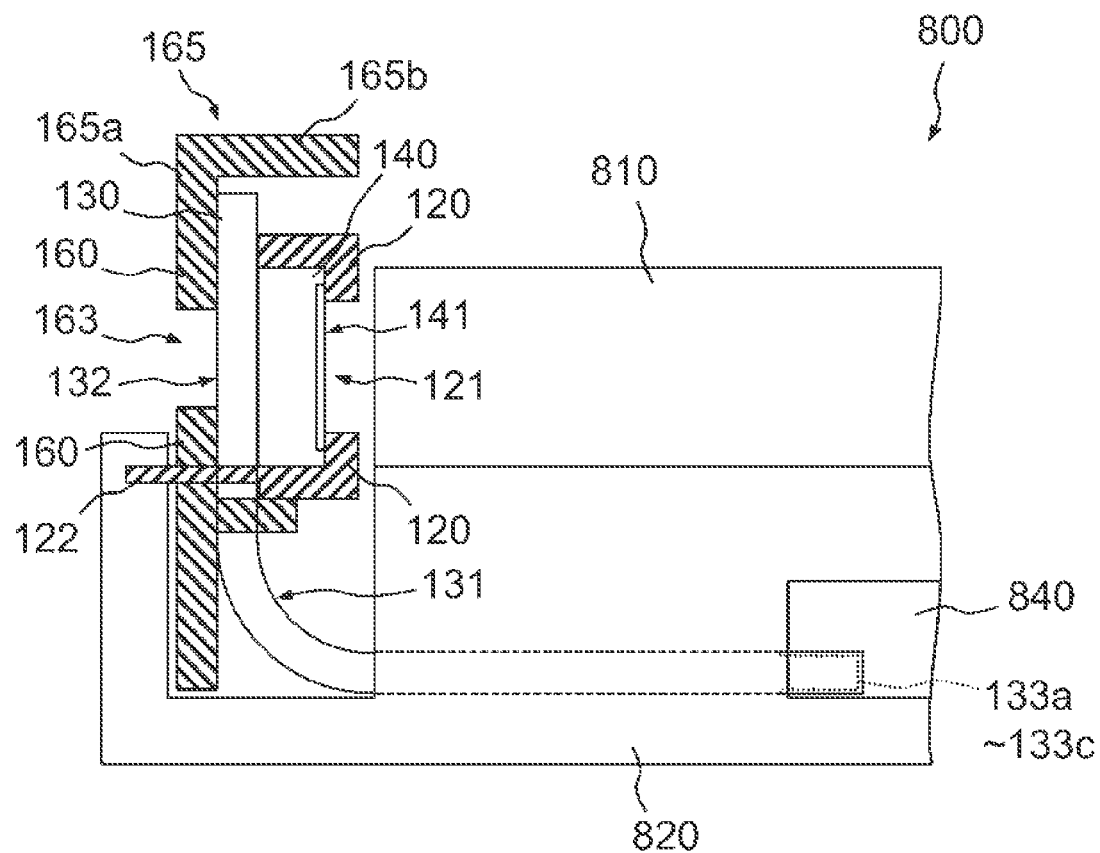
FIG. 14A is a view showing a configuration example of an illumination apparatus incorporating the light emitting unit shown in FIGS. 11A and 11B.

FIG. 14A is a view showing a configuration example of the illumination apparatus 800 incorporating the light emitting unit 100 including the back panel 160 having the extending portion 165. As shown in FIG. 14A, the substrate 130 can be a flexible substrate. As shown in FIGS. 11A to 12B and 14A, the substrate 130 has a shape having a longitudinal direction (the Z direction) and a lateral direction (the Y direction) perpendicular to the longitudinal direction. In this case, the front panel 120 and the back panel 160 can be placed in one end portion of the substrate 130 in the longitudinal direction. Also, as shown in FIGS. 11A to 12B, a plurality of electrodes 133*a* to 133*c* are arranged in another end portion of the substrate 130 in the longitudinal direction. As shown in FIG. 14A, the plurality of electrodes 133*a* to 133*c* are connected to a power supply portion 840 formed in the frame 820 of the illumination apparatus 800.

As shown in FIGS. 11A to 12B and 14A, the extending portion 165 extends in the longitudinal direction from the side, which extends in the lateral direction, of one end portion of the substrate 130 in the longitudinal direction. The back panel 160 can electrically be connected to the electrode 133*a* of the plurality of electrodes 133*a* to 133*c*. In this configuration shown in FIGS. 11B and 12B, a connecting terminal 166 formed in the back panel 160 is in contact with a pad 135 formed in the end portion of a wiring pattern 134, and the back panel 160 is electrically connected to the electrode 133*a*. The wiring pattern 134 can be formed on the surface 132 of the substrate 130 as shown in FIGS. 11B and 12B, and can also be formed on the surface 131. When the substrate 130 has a layered structure, the wiring pattern 134 can be formed in a given layer between the surfaces 131 and 132. As described previously, wiring patterns (conductors, not shown) for supplying electric power from the power supply portion 840 to the light emitting element 140 are formed on the substrate 130. The wiring patterns for supplying electric power to the light emitting element 140 can be connected to the electrodes 133*b* and 133*c* different from the electrode 133*a* electrically connected to the back panel 160. The three electrodes 133*a* to 133*c* are formed in the configuration shown in FIGS. 11A to 12B, but the present invention is not limited to this, and four or more electrodes can be formed on the substrate 130.

Figure 14B:
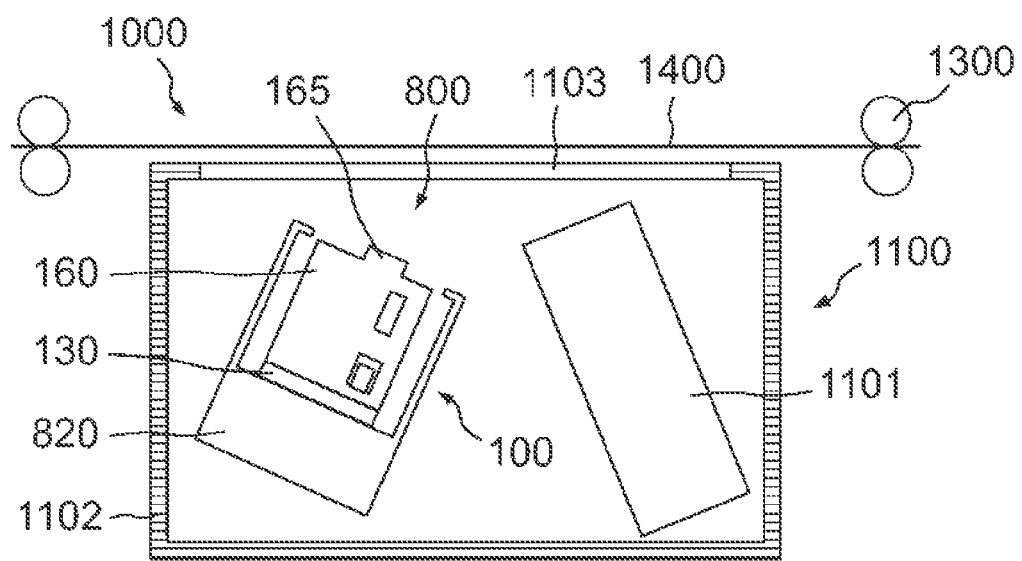
FIG. 14B is a view showing a configuration example of a recording system including the light emitting unit shown in FIGS. 11A and 11B.

In the reading apparatus 1100 including the illumination apparatus 800 incorporating the light emitting unit 100, the position of the extending portion 165 and the electrical connection to the electrode 133*a* as described above effectively function to radiate heat, and to suppress static electricity from damaging the light emitting element 140 and/or a driving circuit (the power supply portion 840 in the configuration shown in FIG. 14A) for controlling the power supply amount to the light emitting element 140. More specifically, as shown in FIG. 14B, the recording medium 1400 can be set in contact with or close to the reading apparatus 1100 to be used in the recording system 1000 using paper or a film as the recording medium 1400. In this state, the recording medium 1400 can be moved by the conveying apparatus 1300 in the same manner as in the recording system 1000 shown in FIG. 10. Also, the user of the recording system 1000 may put the recording medium 1400 on the reading apparatus 1100 and remove the recording medium 1400 after the use. The movement like this of the recording medium 1400 can generate static electricity in the reading apparatus 1100.

As shown in FIG. 14B, the reading apparatus 1100 can include the illumination apparatus 800, the image sensor 1101, and a housing 1102 for accommodating the illumination apparatus 800 and the image sensor 1101. The illumination apparatus 800 illuminates the recording medium 1400 as an illumination target through a window 1103 formed in the housing 1102. The window 1103 formed in the housing 1102 is often made of a dielectric material such as glass or a transparent resin, so static electricity can be generated when the recording medium 1400 moves. This static electricity can damage the light emitting element 140 of the light emitting unit 100 of the illumination apparatus 800 and/or the driving circuit (the power supply portion 840) for controlling the power supply amount to the light emitting element 140.

As shown in FIG. 14B, therefore, the extending portion 165 of the back panel 160 of the light emitting unit 100 is so formed as to extend toward the window 1103 of the reading apparatus 1100 from the outer edge of the substrate 130. Also, the back panel 160 is connected to the electrode 133*a* as described above. The electrode 133*a* to which the back panel 160 is electrically connected is connected to the ground terminal of the power supply portion 840. That is, the back panel 160 is grounded. Consequently, the extending portion 165 functions like a lightning rod, so the static electricity generated by the window 1103 can be conducted from the back panel 160 to the substrate 130 without being passed through the light emitting element 140. In this case, the electrode 133*a* is electrically connected to the back panel 160 as described above, and need not be electrically connected to the light emitting element 140. In other words, electric power can be supplied to the light emitting element 140 by using the electrodes 133*b* and 133*c*. This makes it possible to separate the path for passing the static electricity via the back panel 160 and the path for supplying the electric power to the light emitting element 140, and suppress the static electricity generated by the window 1103 from passing through the light emitting element 140. As a consequence, the extending portion 165 of the back panel 160 can be used not only to effectively radiate heat, but also to suppress the static electricity from damaging the light emitting element 140 and/or the driving circuit (the power supply portion 840) for controlling the power supply amount to the light emitting element. That is, it is possible to improve the reliability of the light emitting unit 100, the illumination apparatus 800 incorporating the light emitting unit 100, the reading apparatus 1100 incorporating the illumination apparatus 800, and the recording system 1000 including the reading apparatus 1100.

The connecting terminal 166 and the pad 135 to which the back panel 160 and the substrate 130 are electrically connected can be positioned not in the vicinity of the light emitting element 140 as shown in FIG. 12A, but in the end portion of the substrate 130 where the electrodes 133 are formed. However, the present invention is not limited to this, and the back panel 160 and the substrate 130 can electrically be connected in appropriate positions. For example, in orthogonal projection with respect to the surface 131 of the substrate 130, the connecting terminal 166 and the pad 135 can be formed in positions overlapping the light emitting element 140.

Figure 13B:
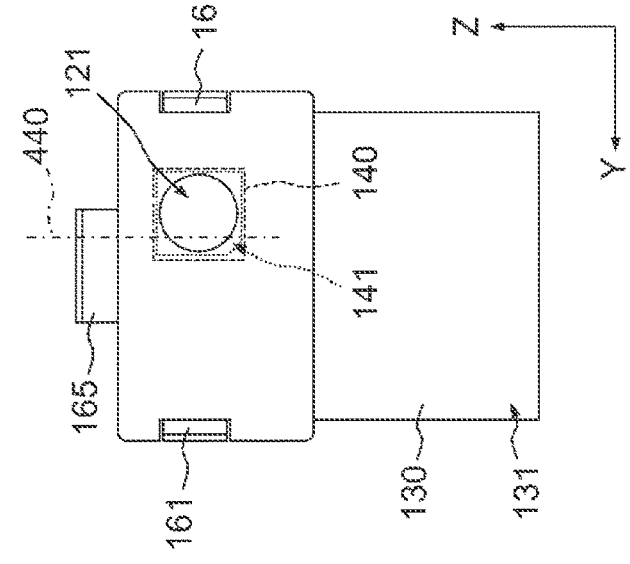
Figure 13A:
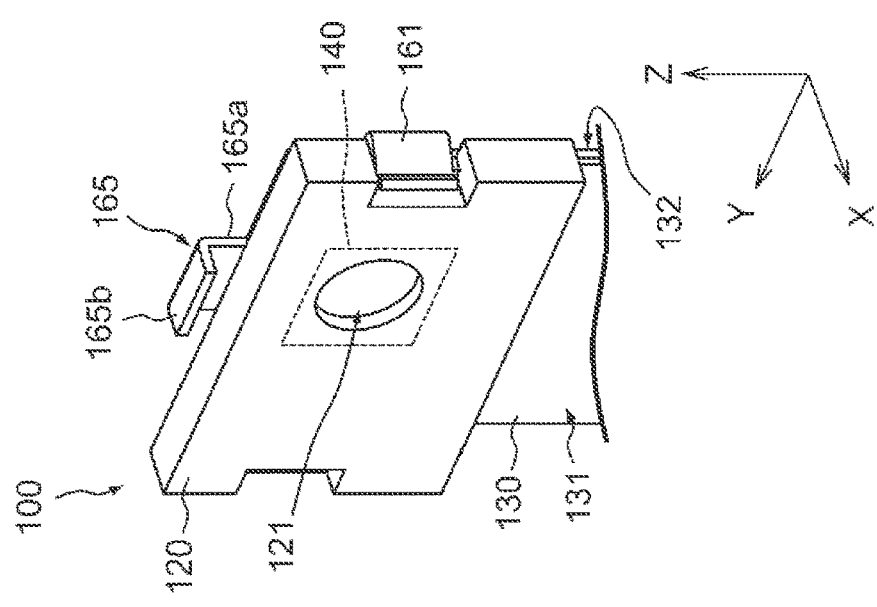

As shown in FIG. 13B, in orthogonal projection with respect to the surface 131 of the substrate 130, the extending portion 165 can be so formed that a virtual line 440 passing the light emitting element 140 in the longitudinal direction (Z direction) passes the extending portion 165. Since the extending portion 165 is formed between the window 1103 of the reading apparatus 1100 and the light emitting element 140, it is possible to suppress the influence of static electricity on the light emitting element 140 and/or the driving circuit (the power supply portion 840) for controlling the power supply amount to the light emitting element 140. Also, the number of the extending portion 165 is not limited to one. Two or more extending portions 165 can be formed as shown in FIG. 13C. In this case, the extending portions 165 can be so formed that the virtual line 440 passing the light emitting element 140 in the longitudinal direction (Z direction) passes one or more extending portions 165.

As described previously, the extending portion 165 can include the portion 165a extending along the surface 132 of the substrate 130, and the portion 165b extending toward the surface 131 of the substrate 130 and connected to the portion 165a. In this case, as shown in FIG. 14A, the distal end of the portion 165b can be so positioned as not to project from the light emitting element 140 and the front panel 120. However, the extending portion 165 can appropriately be designed in accordance with, for example, the position and shape of the light guide body 810, conditions such as the light emitting direction from the light guide body 810, and the shape of the housing 1102 of the reading apparatus 1100. Also, as shown in FIG. 13C, the extending portion 165 need not have the portion 165b extending toward the surface 131 of the substrate 130, and can have only the portion 165a extending along the surface 132 of the substrate 130.

FIG. 15A shows numerical value examples of the electrical resistance of the back panel 160 made of a metal material as described previously, and numerical value examples of the electrical resistance of the front panel 120 made of a resin material as described previously. To suppress static electricity conducted to the back panel 160 from being conducted to the light emitting element 140 via the front panel 120, an R ratio obtained by dividing the resistance value of the front panel 120 by the resistance value of the back panel 160 can satisfy inequality (1) below:

$$1.0\times10^3 < R\ \text{ratio} < 1.0\times10^{30} \tag{1}$$

Combinations of numerical value examples 1 to 4 shown in FIG. 15A satisfy inequality (1). The R ratio can further satisfy inequality (1a) below:

$$1.0\times10^{15} < R\ \text{ratio} < 1.0\times10^{25} \tag{1a}$$

Numerical value examples 1 and 4 shown in FIG. 15A satisfy inequality (1a).

FIG. 15B shows numerical value examples of the thermal conductivity of the back panel 160 made of a metal material as described previously, and numerical value examples of the thermal conductivity of the front panel 120 made of a resin material as described previously. Heat generated by the light emitting element 140 formed on the surface 131 of the substrate 130 must efficiently be conducted to the surface 132 of the substrate 130, and radiated from the back panel 160. In other words, it is necessary to prevent heat generated by the light emitting element 140 from being easily conducted from the front panel 120 to the light guide body 810 and the like. To conduct heat from the front panel 120 to the back panel 160 more efficiently, a C ratio obtained by dividing the thermal conductivity of the front panel 120 by the thermal conductivity of the back panel 160 can satisfy inequality (2) below:

$$1.0\times10^{-7} < C\ \text{ratio} < 1.0 \tag{2}$$

Combinations of numerical value examples 1 to 4 shown in FIG. 15B satisfy inequality (2). The C ratio can further satisfy inequality (2a) below:

$$1.0\times10^{-4} < C\ \text{ratio} < 1.0\times10^{-1} \tag{2a}$$

Numerical value examples 1 to 3 shown in FIG. 15B satisfy inequality (2a).

As described above, the light emitting unit 100 of this embodiment can efficiently conduct heat generated from the light emitting element 140 as a light source to the surface 132 of the substrate 130, which is opposite to the surface 131 on which the light emitting element 140 is formed, thereby radiating the heat. This makes it possible to improve the reliability of the light emitting unit 100 of this embodiment, the illumination apparatus 800 incorporating the light emitting unit 100, the reading apparatus 1100 incorporating the illumination apparatus 800, and the recording system 1000 including the reading apparatus 1100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-143820, filed Aug. 27, 2020, and No. 2021-101792, filed Jun. 18, 2021, which are, hereby incorporated by reference herein in their entirety.

What is claimed is:

1. A light emitting unit comprising a substrate, a light emitting element placed on a first surface of the substrate, a front panel covering the first surface, and a back panel placed on a second surface of the substrate, which is opposite to the first surface,
wherein an opening for extracting light emitted by the light emitting element is formed in the front panel,
the opening is formed to overlap a part of a light emitting surface of the light emitting element, in orthogonal projection with respect to the first surface,
the back panel has a thermal conductivity higher than that of the front panel, and
includes a projecting portion that projects toward the first surface, and
the projecting portion is in contact with at least one of the first surface, the light emitting element, or the front panel.

2. The unit according to claim 1, wherein
an inner wall of the front panel, which includes a circumferential wall of the opening, has a ventilation portion including at least one of a trench or a through hole extending from the inner wall to an outer edge of the front panel, and
an area of the ventilation portion formed in the circumferential wall of the opening is 1% (inclusive) to 20% (inclusive) of an area of the circumferential wall of the opening.

3. The unit according to claim 2, wherein
the ventilation portion is a trench extending from the inner wall to the outer edge of the front panel, and
the trench is formed in that portion of the front panel, which faces the first surface.

4. The unit according to claim 1, wherein the projecting portion projects toward the first surface from outside an outer edge of the substrate.

5. The unit according to claim 1, wherein
the projecting portion includes two fitting portions to be fitted in the front panel, and
a virtual line connecting the two fitting portions passes the light emitting element, in orthogonal projection with respect to the first surface.

6. The unit according to claim 5, wherein assuming that a direction in which the two fitting portions and the light emitting element are arranged is a first direction, and a direction perpendicular to the first direction is a second direction, and
a length of each of the two fitting portions in the second direction is not less than ⅓ a length of the light emitting element in the second direction.

7. The unit according to claim 1, wherein the front panel includes a protruding portion that extends through the substrate and protrudes toward the second surface.

8. The unit according to claim 1, wherein the back panel further includes an extending portion that extends outward from an outer edge of the substrate, in orthogonal projection with respect to the first surface.

9. The unit according to claim 8, wherein the extending portion is not in contact with the first surface, the light emitting element, and the front panel.

10. The unit according to claim 8, wherein
the substrate has a shape having a longitudinal direction and a lateral direction perpendicular to the longitudinal direction,
the front panel and the back panel are arranged in one end portion of the substrate in the longitudinal direction, and
the extending portion extends in the longitudinal direction from a side extending along the lateral direction in one end portion of the substrate in the longitudinal direction.

11. The unit according to claim 10, wherein
a plurality of electrodes are arranged in another end portion of the substrate in the longitudinal direction, and
the back panel and one of the plurality of electrodes are electrically connected.

12. The unit according to claim 10, wherein the extending portion includes a first portion extending along the second surface, and a second portion extending toward the first surface and connected to the first portion.

13. The unit according to claim 10, wherein a virtual line passing the light emitting element in the longitudinal direction passes the extending portion, in orthogonal projection with respect to the first surface.

14. A reading apparatus comprising:
an illumination apparatus including the light emitting unit according to claim 8, a light guide body configured to guide light emitted from the light emitting unit, and a frame configured to accommodate the light emitting unit and the light guide body;
an image sensor configured to obtain image information of an illumination target illuminated by the illumination apparatus; and
a housing configured to accommodate the illumination apparatus and the image sensor,
wherein the illumination apparatus illuminates the illumination target through a window formed in the housing, and
the extending portion extends toward the window from an outer edge of the substrate.

15. The apparatus according to claim 14, wherein the back panel is grounded.

16. An illumination apparatus comprising:
the light emitting unit according to claim 1;
a light guide body configured to guide light emitted from the light emitting unit; and
a frame configured to accommodate the light emitting unit and the light guide body.

17. A reading apparatus comprising:
the illumination apparatus according to claim 16; and
an image sensor configured to obtain image information of an illumination target illuminated by the illumination apparatus.

18. A recording system comprising:
the reading apparatus according to claim 17; and
a recording apparatus configured to record image information obtained by the reading apparatus on a recording medium.

19. Alight emitting unit comprising a substrate, a light emitting element placed on a first surface of the substrate, a front panel covering the first surface, and a back panel placed on a second surface of the substrate, which is opposite to the first surface,
wherein the back panel has a thermal conductivity higher than that of the front panel,
an opening for extracting light emitted by the light emitting element is formed in the front panel,
an inner wall of the front panel, which includes a circumferential wall of the opening, has a ventilation portion including at least one of a trench or a through hole extending from the inner wall to an outer edge of the front panel, and
an area of the ventilation portion formed in the circumferential wall of the opening is 1% (inclusive) to 20% (inclusive) of an area of the circumferential wall of the opening.

20. The unit according to claim 19, wherein the opening is formed to overlap a part of a light emitting surface of the light emitting element, in orthogonal projection with respect to the first surface.

* * * * *